United States Patent [19]

Cameron

[11] Patent Number: 4,546,650

[45] Date of Patent: Oct. 15, 1985

[54] SPEED AND DISTANCE CALCULATOR FOR SKIS

[76] Inventor: John F. Cameron, 2048 Marich Way, Mountain View, Calif. 94040

[21] Appl. No.: 535,331

[22] Filed: Sep. 23, 1983

[51] Int. Cl.[4] .......................... A63C 11/00; G01P 1/00
[52] U.S. Cl. ......................................... 73/490; 73/493; 280/809; 324/171
[58] Field of Search ................ 73/490, 493, 494, 187; 24/306, 442; 280/809; 324/171

[56] References Cited

U.S. PATENT DOCUMENTS

| Re. 28,839 | 6/1976 | Overs | 73/187 |
| 3,505,878 | 4/1970 | Moll | 73/490 |
| 3,978,725 | 9/1976 | Hadtke | 73/493 |
| 4,206,637 | 6/1980 | Pankonien | 73/187 |
| 4,352,063 | 9/1982 | Jones | 324/171 |

*Primary Examiner*—S. Clement Swisher

[57] ABSTRACT

The device accurately calculates, retains and digitally displays the average speeds of and/or distances traveled by a skier. These functions are performed non-mechanically thereby allowing the ski to perform naturally. The device can be easily installed upon and removed from the ski without the use of tools and can mount upon the ski without causing any permanent damage to the ski.

11 Claims, 5 Drawing Figures

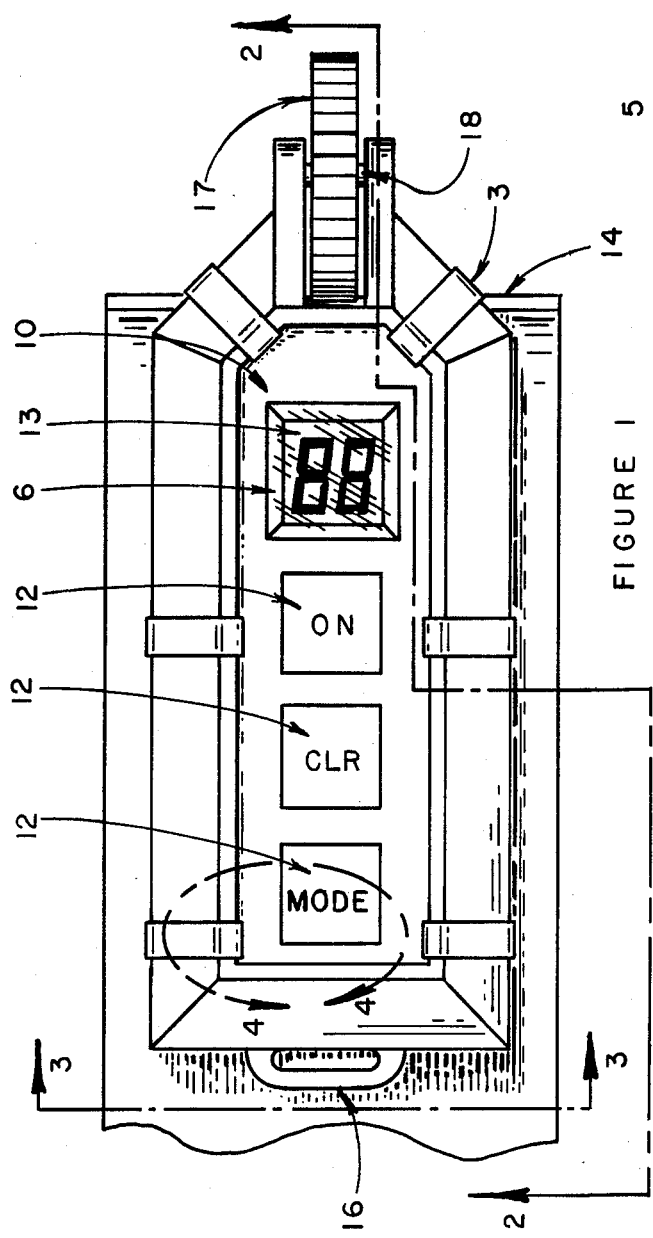
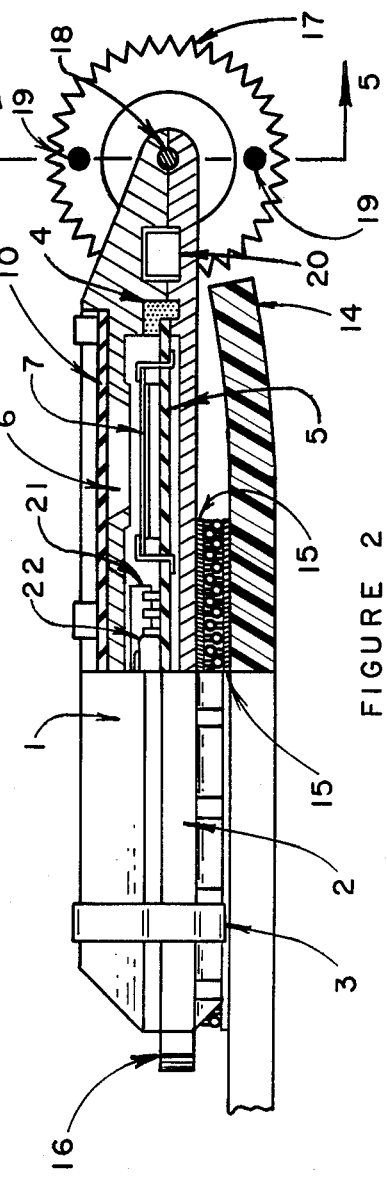
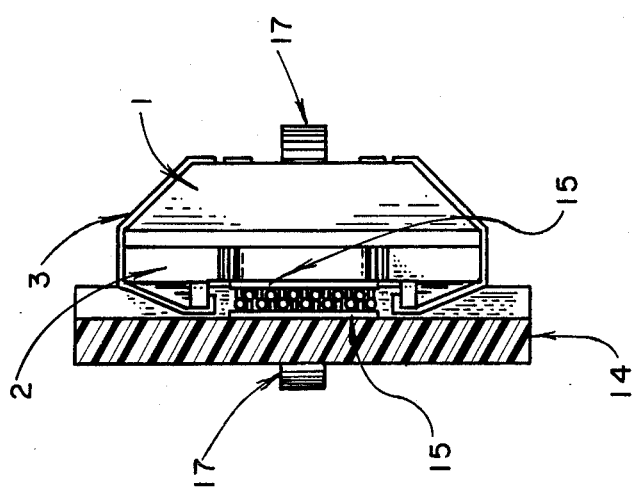
FIGURE 1
FIGURE 2
FIGURE 3

SPEED AND DISTANCE CALCULATOR FOR SKIS

BACKGROUND OF THE INVENTION

1. Field of the Invention

This invention relates to speed detecting devices, and particularly such a device applicable to skis, 2. Description of the Prior Art With reference to the classification of art as established in the United States Patent and Trademark Office the present invention is believed found in the general Class 73 entitled, "Measurement and Testing", and more specifically in subclass 490. A search in this field has revealed the U.S. Pat. Nos. 3,505,878 and 4,262,537. The devices taught by these patents must be fastened to the ski with screws and must both be mechanically powered by the transmission of the torque from teethed wheels, thereby adding the impedance of the measuring device to the natural operation of the ski.

As the skill of the skier increases such subtleties as the sharpness of a ski edge or even the condition of the wax on the ski bottom become critical when maneuvering at high speeds. Olympic skiing events are frequently decided by one-hundredths of a second. Such a skier would surely appreciate being able to instantly evaluate the effectiveness of a new technique while practising. However, the means for such an indication would have to have a minimal retarding effect upon the skier's forward travel and would have to be placed where it would not alter the ability of a ski edge to cut when making a turn or the like.

It is not unusual for a skier to have different skis for different environmental conditions. It would be desirable for the device described above to be easily transferrable from ski to ski and due to the high cost of skis, for the mounting means to not damage the ski. The ability to remove the device conveniently is also appealing from a security standpoint because the ski could then be left unattended while the skier relaxed elsewhere.

Cross-country skiing affords the skier an opportunity to explore areas that are substantially inaccessible by other practical means. This physically exerting sport is often combined with outdoor camping resulting in long lasting excursions many miles from civilization. The weather in such areas can be quite unpredictable and is capable of rendering conditions whereby a skier could not visually recognize landmarks or previous tracks in the snow. A device capable of measuring the distance skied could enable a skier to know his location at all times and to keep traveling with a compass and map. Owing to the nature of cross-country skiing, such a device should be light and compact so as not to add a significant amount of weight to the ski upon which it is mounted.

It is the object of this invention to provide an accurate indication of speed and/or distance to a skier of snow and/or water to accomplish the results enumerated above.

It is a further object of this invention to provide a nonmechanical method of powering the means for obtaining and displaying speed and/or distance so as to have a minimum negative effect upon the natural performance of the ski.

It is a still further object of this invention to provide a means for displaying the speed and/or distance digitally so as to provide the information at a glance.

It is a still further object of this invention to provide a demountable method of mounting the present device to the ski that does not require the use of tools or cause physical damage to the ski.

It is a still further object of this invention to embody the device as simply and as economically as possible so as to make the device amenable to mass production techniques.

The invention possesses other objects and features of advantages, some of which with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, this invention employs a microcomputer that calculates speeds of and/or the distance traveled by a skier with a minimum effect on the natural performance and/or cosmetics of the ski.

This device is contained and protected by a housing that is directly attached to the ski. The housing is comprised of a top half and a bottom half the union of which is sealed by a gasket. Clips are disposed around the periphery of the assembled housing halves to provide pressure necessary to form a good gasket seal.

A toothed wheel attached to a shaft constrained by the housing to rotate about an axis lateral to the ski is positioned at the rear and extended over the back of, the ski. The wheel is positioned in such a way that it makes contact with the snow or water, thereby causing the wheel to rotate when the assembly moves in the direction of the axis of the ski. Two permanent magnets are attached to the wheel. A non-contact sensor, such as a Hall effect device, is mounted in the housing of the device in such a way as to sense the passage of the magnets in the wheel. Hall effect sensors detect magnetic field changes. The magnets are placed in the wheel such that on a given face of the wheel the North pole of one magnet will be pointed out while the South pole of the other magnet faces out. A signal is sent to the microprocessor when the sensor detects that the magnetic field has changed back to its original polarity, thereby indicating a wheel rotation.

The microcomputer is employed to both time and count wheel rotation periods. These data along with the known circumference of the wheel are then used to calculate quantities such as the maximum speed, an average speed over a selected period of time, the total distance traveled during a selected period of time, or the speed last calculated. Results of the above calculations are displayed digitally.

BRIEF DESCRIPTION OF THE DRAWINGS

FIG. 1 is a top plan view of the device mounted on the rear of the ski.

FIG. 2 is a fragmentary cross-sectional view of the device mounted on a ski taken in the planes indicated by the broken line 2—2 in FIG. 1.

FIG. 3 is a vertical cross-sectional view taken in the plane indicated by the line 3—3 in FIG. 3.

DESCRIPTION OF THE PREFERRED EMBODIMENT

Figure 4:
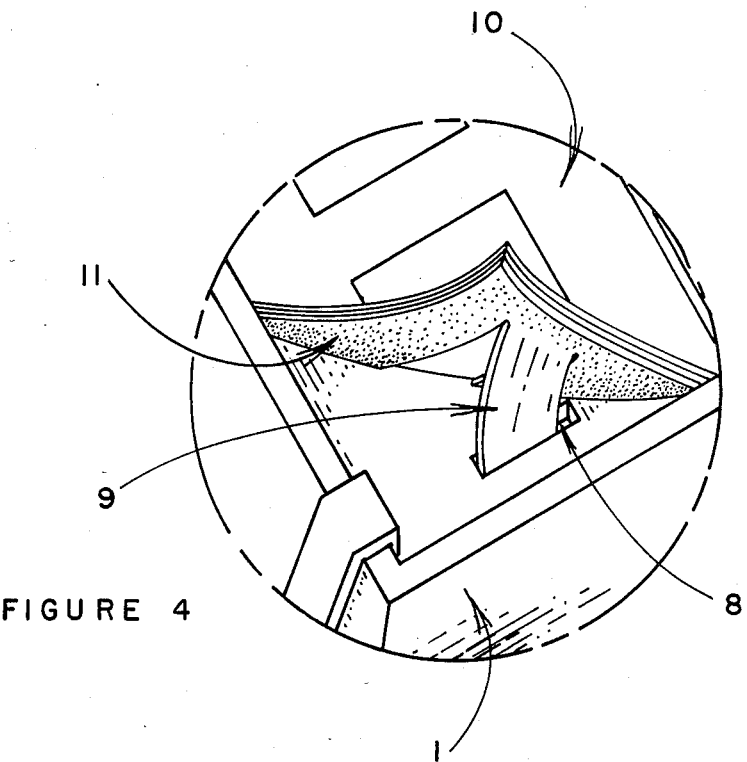
FIG. 4 is a detailed view of the portion of the device encircled by the line 4—4 in FIG. 1 so as to display otherwise hidden features.

The device is contained and protected by a two-part, hollow, elongated, plastic housing. This housing is comprised of a top half 1 and a bottom half 2 as best depicted in FIG. 2. FIGS. 1 to 3 illustrate how clips 3 hold the top housing half 1 against the bottom housing half 2 and also compress a gasket 4 which serves to seal the union against contaminants such as water. The gasket 4 also clamps the printed circuit board 5 tightly in place against the bottom housing half 2. The top housing half has two apertures. FIGS. 1 and 2 show the window aperture 6 which permits viewing of the digital display 7 which is attached to the printed circuit board 5 below. FIG. 4 shows the flexible lead aperture 8 through which the flexible lead 9 is passed. The flexible lead 9 is a part of one of the layers of the multilayered top panel 10, which is attached with pressure-sensitive adhesive 11 to the top housing half 1. The top panel 10 contains membrane switches 12 which are used to control the functions of the device. The portion of the top panel that covers the window aperture 10 is transparent and forms a display window 13. Both the window aperture 6 and the flexible lead aperture 8 are completely covered by the top panel which extends sufficiently beyond them to form a protective seal when the panel is pressed down and adheres itself to the top housing half.

FIGS. 2 and 3 illustrate how the device is attached to a ski 14. Two thin plastic strips 15 have pressure-sensitive adhesive on one side and a dense pattern of bulb-headed stems, which exetend on axes perpendicular to the plane of the plastic strip, on the other side. One plastic strip is adhered to the top face and rear end of a ski while the other plastic strip is adhered to the bottom side of the bottom housing half 2. When the device is pressed down upon the ski such that the plastic strip on the bottom of the divice is over the plastic strip on the ski, the two plastic strips engage positively with each other forming a secure method of holding the device to the ski that does not cause permanent damage to the ski such as with screw holes. For the purpose of explanation, this fastening system may be thought of as a kind of plastic VELCRO (VELCRO is a registered trademark).

Means are provided to attach to the device a restraint, such as a strap or cord, which may also be attached to the ski, such as to the binding of the ski. This restraint ring 16 is an integral part of the bottom housing half 2. In the event of an accident whereby the device could become dislodged from the primary fastening system comprised of the two plastic strips, the device could still remain attached to the ski by virtue of said restraint which would prevent the device from being flung off to either strike someone or become lost. The restraint should not attach the device directly to the skier as this could result in injury to the skier in the event of such an accident.

Figure 5:
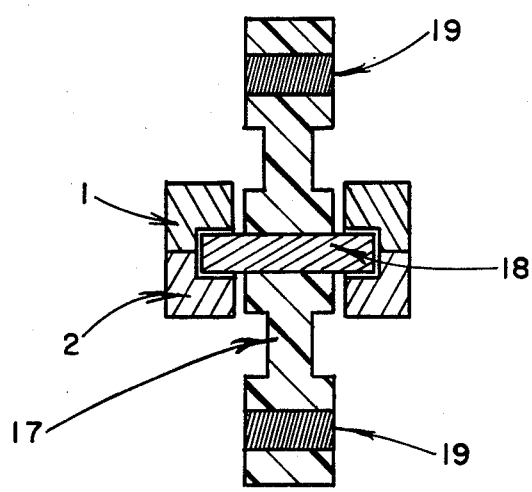
FIG. 5 is a cross-sectional view taken in the plane indicated by the line 5—5 in FIG. 2.

FIG. 5 illustrates the toothed wheel 17 tightly attached to the stainless steel shaft 18 and to the magnets 19. The shaft, hence the wheel, is free to rotate in the recesses of the bifurcated part of the plastic housing that are formed when the top housing half 1 is attached to the bottom housing half 2. An economical bearing of sufficient quality is thus formed allowing the wheel to rotate with respect to the device and ski. The Hall effect sensor 20 is supported in the top housing half 1 as shown in FIG. 2. The sensor is placed so that it may detect magnetic field changes induced by the passage of the magnets attached to the wheel. For example, in FIG. 5 let the top magnet be oriented so that its North pole points out of the right hand face of the toothed wheel 17 while the bottom magnet is oriented so that its South pole points out of this same side. A rotation of the wheel will be indicated by the Hall effect sensor 20 when the magnetic field is sensed to have changed back to its original polarity. This indication is then sent to the microcomputor 21 via the conductive leads (not shown) of the Hall effect sensor 20.

FIG. 3 exaggerates the protrusion of the wheel from the plane formed by the bottom of the ski. This is done so that the wheel may be more easily recognized as such. In actuality, the wheel would only extend about one-sixteenth of an inch.

The cross-sectional view of the device in FIG. 2 shows the major components of the printed circuit board 5. They comprise the microcomputer 21, a battery 22, and the digital display 7. Other support electronics such as resistors, capacitors and a crystal are not shown in order to simplify the figure.

Having thus described the invention, what is claimed to be new and novel and sought to be protected by Letters Patent of the United States is as follows:

1. A device for measuring speed or distance travelled between a vehicle adapted to be attached to a human foot and a relatively immovable surface, comprising: (a) at least one wheel rotatably mounted on said vehicle, the perimeter of said wheel adapted to contact the surface over which said vehicle is moving, thus causing said wheel to rotate; (b) a base on which said wheel is mounted for rotation; (c) means on the base for sensing and counting the number of revolutions of said wheel in point of time for calculating speed or distance of movement of said vehicle over said surface wherein said sensing or counting means are powered by a power source other than said wheel; (d) means for storing information representative of said speed or distance; and (e) means for selectively displaying said stored information.

2. A device according to claim 1, wherein a two-part sensing means is provided cooperatively interposed between said wheel and base.

3. A device according to claim 1, wherein said stored information is selectively displayed digitally.

4. A device for measuring speed or distance travelled by a ski over any surface, comprising: (a) at least one wheel rotatably mounted on said ski, the perimeter of said wheel adapted to contact the surface over which the ski is moving, thus causing said wheel to rotate; (b) a base on hich said wheel is mounted for rotation; (c) means on the base for sensing and counting the number of revolutions of said wheel in point of time for calculating speed or distance of movement of the ski over said surface wherein said sensing or counting means are powered by a power source other than said wheel; (d) means for storing information representative of said speed or distance; and (e) means for selectively displaying said stored information.

5. A device for measuring speed or distance travelled by a snow ski, comprising: (a) at least one wheel rotatably mounted on said ski, the perimeter of said wheel adapted to contact the snow over which the ski is moving, thus causing said wheel to rotate; (b) a base on which said wheel is mounted for rotation; (c) means on the base for sensing and counting the number of revolutions of said wheel in point of time for calculating speed or distance of movement of the ski over the snow wherein said sensing or counting means are powered by a power source other than said wheel; (d) means for storing information representative of said speed or distance; and (e) means for selectively displaying said stored information.

6. A device for measuring speed or distance travelled by a water ski, comprising: (a) at least one wheel rotatably mounted on said ski, the perimeter of said wheel adapted to contact the water over which the ski is moving, thus causing said wheel to rotate; (b) a base on which said wheel is mounted for rotation; (c) means on the base for sensing and counting the number of revolutions of said wheel in point of time for calculating speed or distance of movement of the ski over the water wherein said sensing or counting means are powered by a power source other than said wheel; (d) means for storing information representative of said speed or distance; and (e) means for selectively displaying said stored information.

7. A device for measuring speed and/or distance travelled between a movable object and a relatively immovable surface, comprising: (a) at least one wheel rotatably mounted on said movable object, the perimeter of said wheel adapted to contact the surface over which said object is moving, thus causing said wheel to rotate; (b) a base on which said wheel is mounted for rotation; (c) means on the base for sensing and counting the number of revolutions of said wheel in point of time for calculating speed and/or distance of movement of the object over said surface; and (d) wherein said device is detachably mounted on said movable object by means that do not require the use of tools and do not cause permanent damage to said object.

8. A device for measuring speed and/or distance travelled between a movable object and a relatively immovable surface, comprising: (a) at least one wheel rotatably mounted on said movable object, the perimeter of said wheel adapted to contact the surface over which said object is moving, thus causing said wheel to rotate; (b) a base on which said wheel is mounted for rotation; (c) means on the base for sensing and counting the number of revolutions of said wheel in point of time for calculating speed and/or distance of movement of the object over said surface; and (d) wherein said base includes means for attachment of a flexible restraint the other end of which may be attached to the object of which the speed and/or distance is being measured.

9. A device for measuring speed or distance travelled between a sliding wheeless vehicle and a relatively immovable surface, comprising: (a) at least one wheel rotatably mounteed on said wheeless vehicle, the perimeter of said wheel adapted to contact the surface over which said wheeless vehicle is moving, thus causing said wheel to rotate; (b) a base on which said wheel is mounted for rotation; (c) means on the base for sensing and counting the number of revolutions of said wheel in point of time for calculating speed or distance of movement of said wheeless vehicle over said surface wherein said sensing or counting means are powered by a power source other than said wheel; (d) means for storing information representative of said speed or distance; and (e) means for selectively displaying said stored information.

10. A device according to claim 9 wherein a two-part sensing means is provided cooperatively interposed between said wheel and base.

11. A device according to claim 9 wherein said stored information is selectively displayed digitally.

* * * * *